(12) United States Patent
Feng

(10) Patent No.: US 8,201,472 B2
(45) Date of Patent: Jun. 19, 2012

(54) ROBOT ARM

(75) Inventor: Yong Feng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 328 days.

(21) Appl. No.: 12/644,340

(22) Filed: Dec. 22, 2009

(65) Prior Publication Data

US 2011/0100146 A1     May 5, 2011

(30) Foreign Application Priority Data

Oct. 29, 2009    (CN) .......................... 2009 1 0309065

(51) Int. Cl.
*B25J 17/00* (2006.01)
*B25J 17/02* (2006.01)
*B25J 18/00* (2006.01)

(52) U.S. Cl. ..................... 74/490.01; 74/490.03; 901/19

(58) Field of Classification Search ............... 74/490.01, 74/490.03, 490.04, 490.05; 901/14, 19, 23
See application file for complete search history.

(56) References Cited

U.S. PATENT DOCUMENTS

| | | | | |
|---|---|---|---|---|
| 4,706,515 A * | 11/1987 | Yasukawa | .................. | 74/490.04 |
| 5,203,748 A * | 4/1993 | Sawada et al. | ................. | 475/183 |
| 5,271,292 A * | 12/1993 | Sawada et al. | ............. | 74/490.04 |
| 5,314,293 A * | 5/1994 | Carlisle et al. | ............. | 414/744.5 |
| 5,634,377 A * | 6/1997 | Kimura et al. | ............. | 74/490.04 |
| 5,655,412 A * | 8/1997 | Luik | .......................... | 74/490.01 |
| 2005/0087034 A1* | 4/2005 | Friedrich et al. | ........... | 74/490.03 |
| 2010/0050806 A1* | 3/2010 | Ono et al. | .................. | 74/490.02 |

* cited by examiner

*Primary Examiner* — Justin Krause
(74) *Attorney, Agent, or Firm* — Altis Law Group, Inc.

(57) ABSTRACT

A robot arm includes a base, a first arm, and a second arm. The base includes a first spindle and a first motor to rotate the first spindle in a first axis. The first arm is rotatably connected to the base around the first axis. The second arm is rotatably connected to the first arm around a second axis parallel to the first axis. The second arm includes a second spindle, a second motor to rotate the second spindle, third spindle, a third motor to rotate the third spindle, a threaded rod extending along a third axis parallel to the first axis and rotated by the second spindle, a nut threaded on the threaded rod, a fourth motor fixed relative to the nut, and a fourth spindle connected to and rotated by the fourth motor. The nut moves along the threaded rod to slide the fourth spindle.

12 Claims, 5 Drawing Sheets

ROBOT ARM

BACKGROUND

1. Technical Field

The present disclosure generally relates to robotics, and particularly, to a selective compliance assembly robot arm (SCARA) used in manufacturing.

2. Description of Related Art

Robot arms are used extensively in manufacturing. One type, selective compliance assembly robot arms (SCARA), are used to assemble components, such as electrical components onto printed circuit boards. The SCARA can rotate around three vertical, parallel axes and track along a vertical axis, to clamp and assemble components.

A SCARA often includes a base, a first arm, and a second arm. The second arm includes a spindle and a driver to rotate the spindle. The spindle is connected to a pulley by a spline. The movement is transmitted from the driver to the spindle by a drive belt. However, the drive belt increases the inertia ratio of the driver, resulting in control difficulties. In addition, the drive belt may deform when the spindle rotates at high speed, lowering transmission precision of the SCARA.

Therefore, a robot arm is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
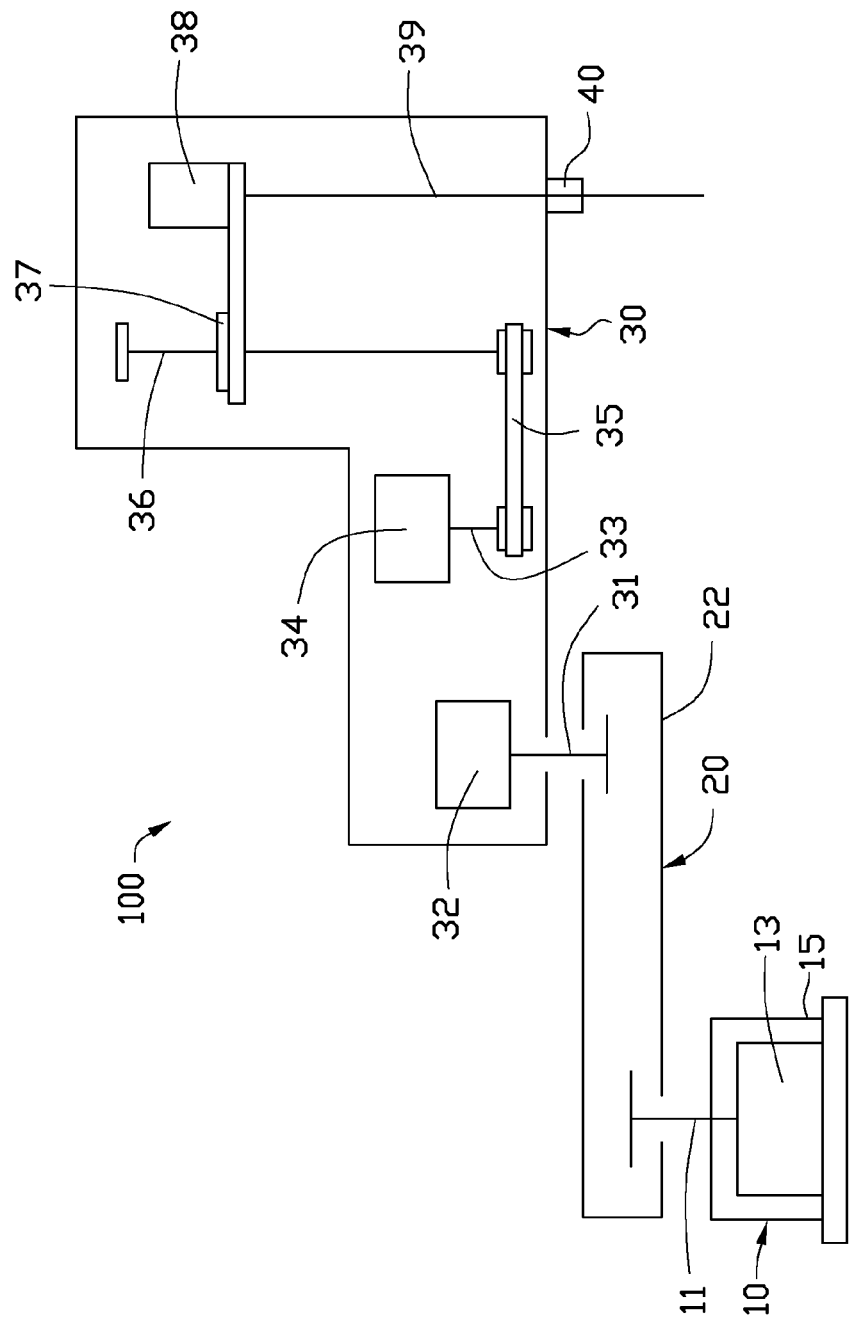
FIG. 1 is a schematic view of one embodiment of a robot arm.
Figure 2:
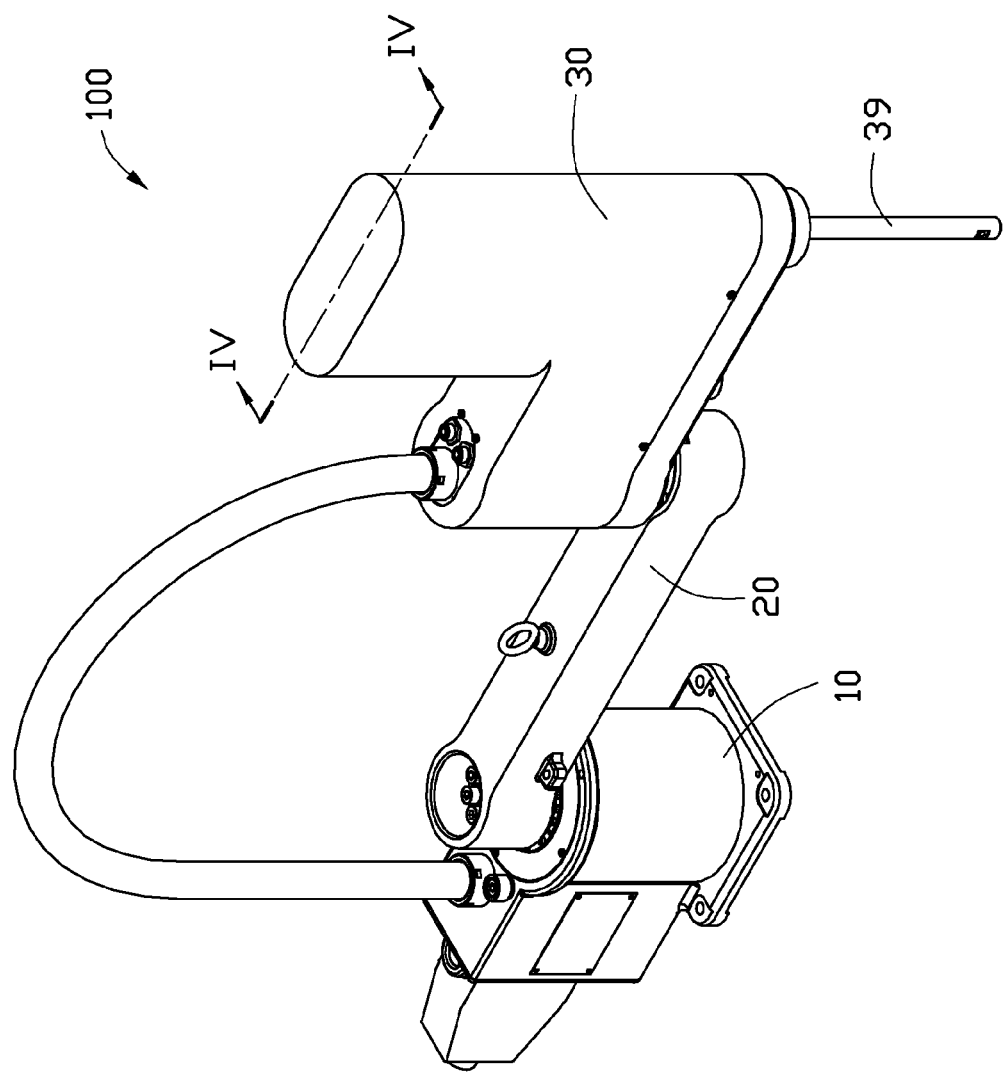
FIG. 2 is an isometric, assembled view of the robot arm of FIG. 1, the robot arm including a base, a first arm, and a second arm.

Referring to FIG. 1 and FIG. 2, an embodiment of a robot arm 100 is shown. The robot arm 100 is a selective compliance assembly robot arm and includes a base 10, a first arm 20, and a second arm 30. The base 10 is anchored to the ground or a worktable to mount the robot arm 100 thereon.

The base 10 includes a first spindle 11, a first motor 13 to rotate the first spindle 11, and a first housing 15 to receive the first spindle 11 and the first motor 13. The first arm 20 includes a second housing 22 and is rotatably connected to the base 10 via the first spindle 11.

The second arm 30 includes a second spindle 31, a second motor 32 to rotate the second spindle 31, a third spindle 33, a third motor 34 to rotate the third spindle 33, a transmission mechanism 35, a threaded rod 36, a nut 37, a fourth motor 38, a fourth spindle 39 rotated by the fourth motor 38, and a bearing unit 40.

The transmission mechanism 35 is connected to the third spindle 33 and the threaded rod 36 to transmit movement from the third spindle 33 to the threaded rod 36. The nut 37 is threaded on the threaded rod 36 and fixed relative to the fourth motor 38. The fourth spindle 39 passes through the bearing unit 40.

Figure 3:
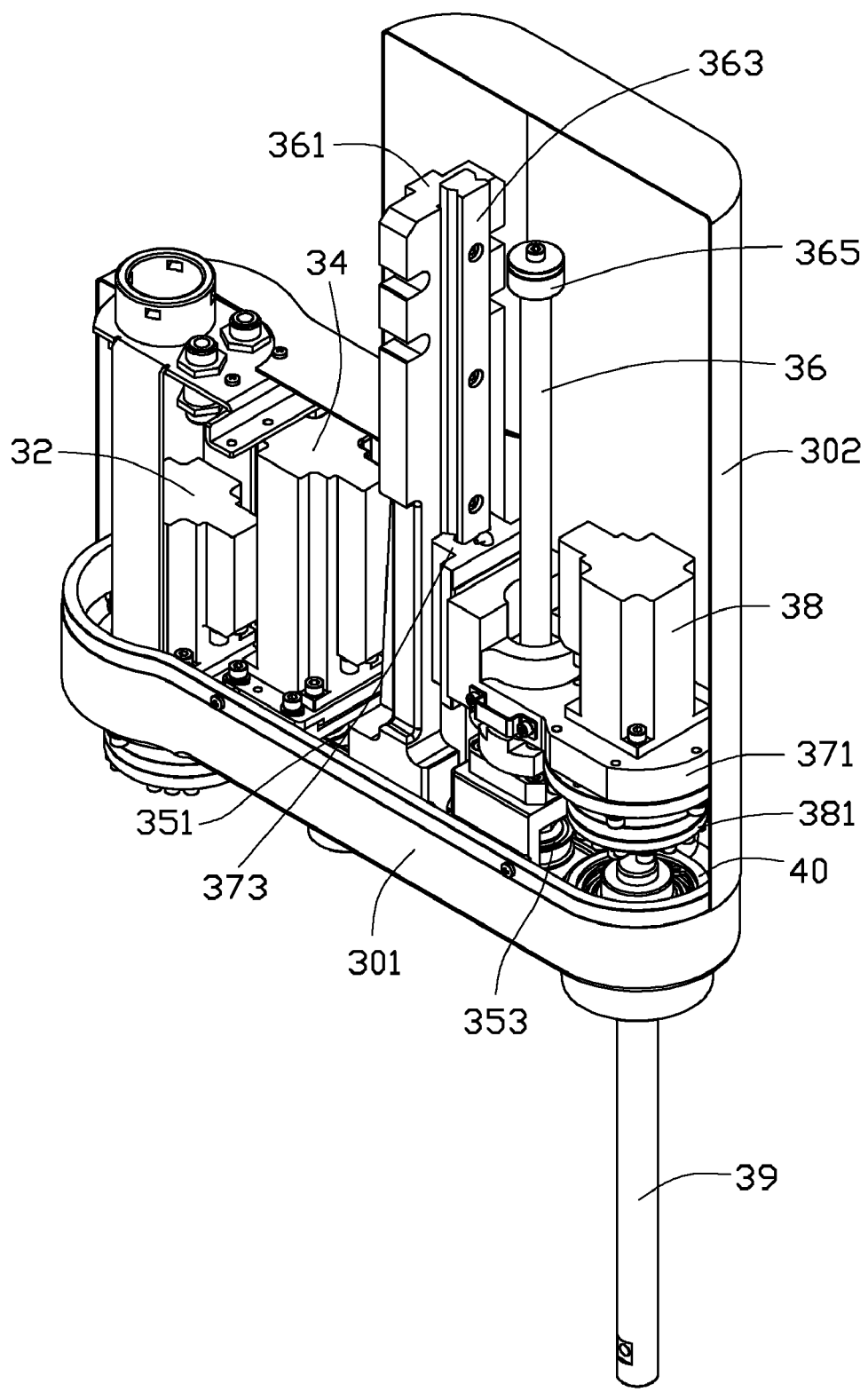
FIG. 3 is a cutaway view of the second arm of the robot arm of FIG. 2.
Figure 4:
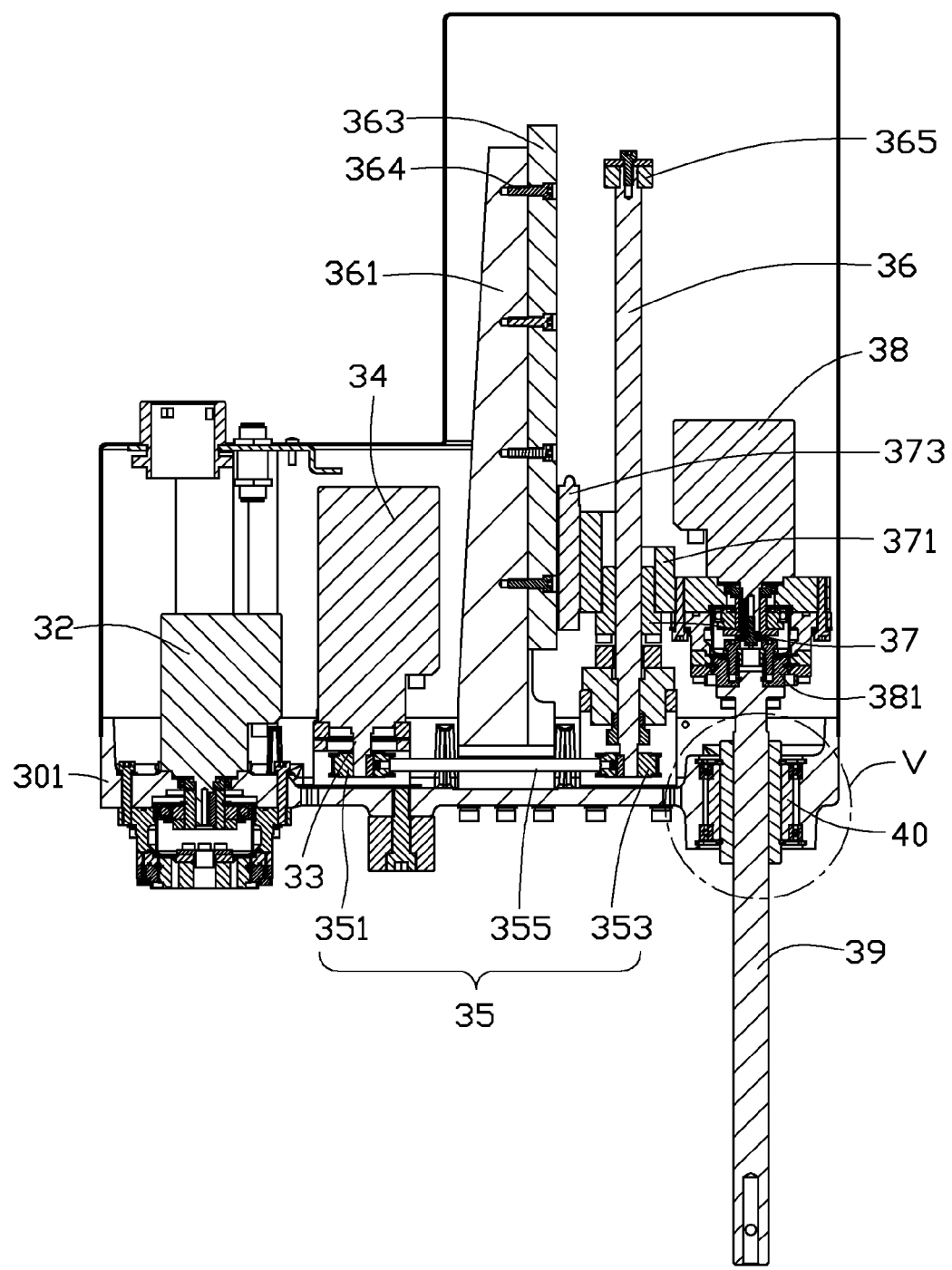
FIG. 4 is a cross-section of the robot arm taken along line IV-IV of FIG. 2.

Referring to FIG. 3 and FIG. 4, the second arm 30 further comprises a mounting seat 301 and a third housing 302 mounted on the mounting seat 301 to cover the second motor 32, the third spindle 33, the third motor 34, the transmission mechanism 35, the threaded rod 36, the nut 37, and the fourth motor 38. The second motor 32, the third motor 34 and the bearing unit 40 are fixed on the mounting seat 301, and the threaded rod 36 is rotatably mounted on the mounting seat 301. The mounting seat 301 is closer to the first arm 20 than the third housing 302. In this structure, the second arm 30 has a low center of gravity, decreasing inertia and increasing stability thereof. The transmission mechanism 35 includes a first wheel 351, a second wheel 353, and a drive belt 355 wrapped around the first wheel 351 and the second wheel 353. The first wheel 351 is fixedly sleeved on the third spindle 33 and the second wheel 353 is fixedly sleeved on the bottom end of the threaded rod 36. The transmission mechanism 35 transmits movement of the third spindle 33 to the threaded rod 36.

To ensure sliding precision of the nut 37 along the threaded rod 36, the second arm further includes a guiderail base 361, a guiderail 363, a connecting plate 371, and a slider 373. The guiderail base 361 is fixed on the mounting seat 301 between the third motor 34 and the threaded rod 36. The guiderail 363 is a strip substantially parallel to the threaded rod 36 and fixed on the guiderail base 361 via a plurality of fasteners 364. The connecting plate 371 is fixed and sleeved on the nut 37, and fixed on the fourth motor 38. The slider 37 is fixed to the connecting plate 371 and slidably engages on the guiderail 363. When the nut 37 moves along the threaded rod 36, the slider 37 moves along the guiderail 363. A stop 365 at a top end of the threaded rod 36 prevents the nut 37 from falling off the threaded rod 36.

The second arm 30 further includes a reduction gear 381 disposed between the fourth motor 38 and the fourth spindle 39, to decrease rotation speed and promote an output moment of the fourth spindle 39. The reduction gear 381 is fixed to the connecting plate 371. In the illustrated embodiment, the fourth motor 38 is a servomotor with low inertia, and the reduction gear 381 is a solid spindle harmonic reducer.

The fourth spindle 39 defines a connecting hole 391 at an end opposite to the end connected to the reduction gear 381 and the fourth motor 38. Various terminals, such as a clamp, a cutting tool, or a measuring device, may be mounted on the fourth spindle 39 via the connecting hole 391.

Figure 5:
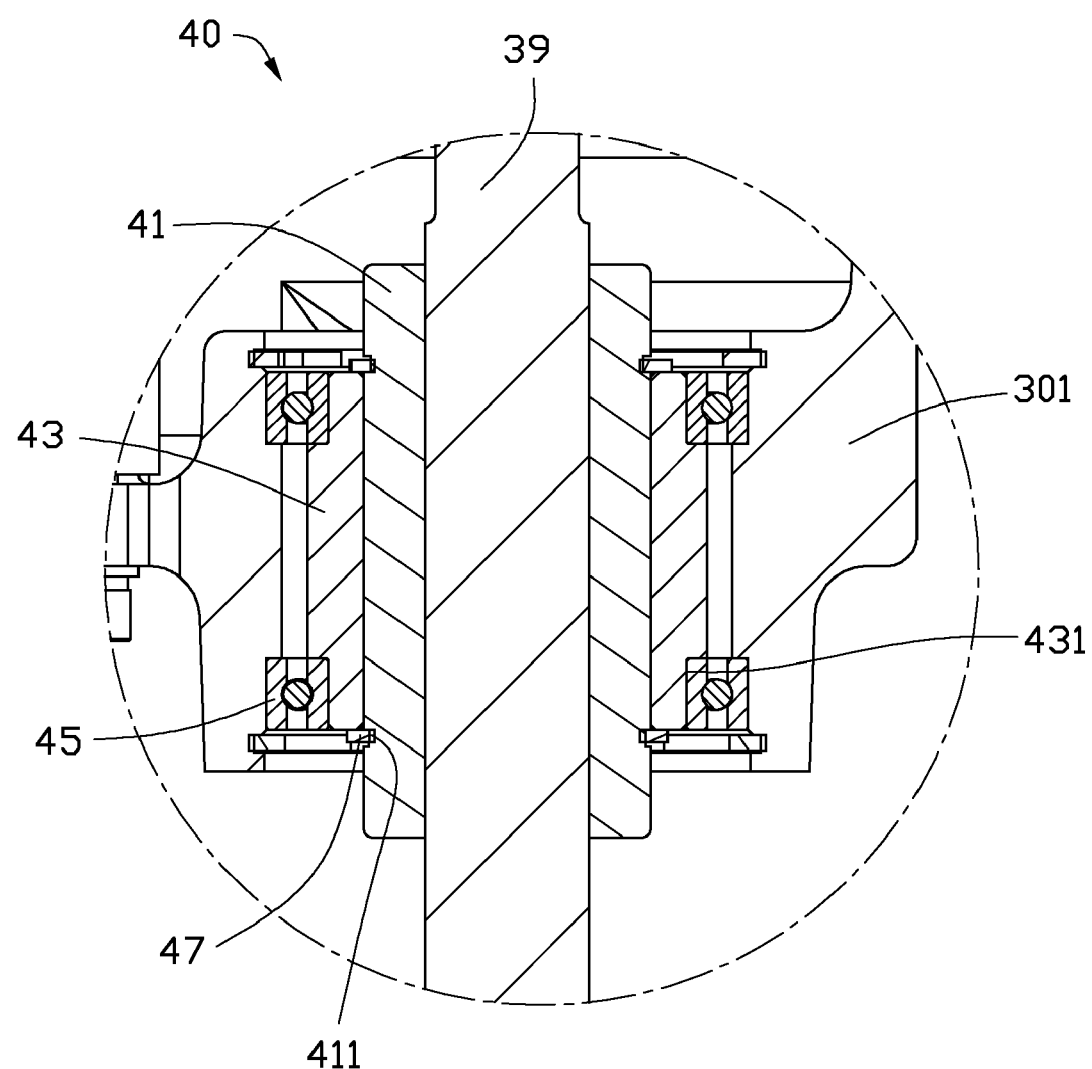
FIG. 5 is an enlarged view of a region V of FIG. 4.

Referring to FIG. 5, the bearing unit 40 includes a linear bearing 41, a tube 43, two rolling bearings 45, and two clips 47. The fourth spindle 39 slidably passes through the linear bearing 41. The tube 43 is sleeved on the linear bearing 41, and the rolling bearings 45 are positioned between the tube 43 and the mounting seat 301. The rolling bearings 45 are at opposite ends of the tube 43. The linear bearing 41 defines an annular groove 411 adjacent to each end thereof, and the mounting seat 301 defines two annular grooves (not labeled) corresponding to the grooves 411. The clips 47 are positioned in the grooves 411 of the linear bearing 41 and the groove of the mounting seat 301 to keep the rolling bearings 45 and the tube 43 in position. The tube 43 is fixed to the linear bearing 41. The tube 43 defines two slots 431 at opposite ends to receive the inner tubes of the rolling bearings 43, and the mounting seat 301 defines two slots (not labeled) to receive the outer tubes of the rolling bearings 43. Friction between the inner tubes and the outer tubes of the rolling bearings 43 is less than that between the fourth spindle 39 and the linear bearing 41. In the illustrated embodiment, the rolling bearings 45 are deep groove ball bearings.

The first spindle 11 is rotated by the first motor 13 and the second spindle 31 is rotated by the second motor 32, thus the terminals may swing in a plane perpendicular to the first spindle 11 and the second spindle 31. The third motor 34 rotates the third spindle 33 and the first wheel 351, thus rotating the second wheel 353. As such, the threaded rod 36 is rotated. The nut 37 threaded on the threaded rod 36 moves therealong as the threaded rod 36 rotates. The connecting plate 371 moves together with the nut 37 along the threaded rod 36. Thus, the fourth motor 38, the reduction gear 381 and the fourth spindle 39 move substantially parallel to the threaded rod 36, and the slider 373 slides along the guiderail 363. As such, the fourth spindle 39 can move the terminals along an axis thereof. When the terminals are to be rotated, the fourth motor 38 rotates the fourth spindle 39. The linear bearing 41 and the tube 43 rotate together with the fourth spindle 39.

The fourth spindle 39 is driven by the fourth motor 38 without a transmission mechanism such as drive belt or spline, thus the robot arm 100 has high precision, high stability, and quick response. Testing shows a maximal load of the robot arm 100 of 20 kg, and the fourth spindle 39 permits an eccentricity of 100 mm.

Alternatively, if friction between the inner tubes and the outer tubes of the rolling bearings 43 exceed that between the fourth spindle 39 and the linear bearing 41, the fourth spindle 39 rotates relative to the linear bearing 41. The tube 43 may thus be omitted. The reduction gear 381 may be omitted if the fourth motor 38 has a low rotation speed. If the threaded rod 36 is fixed to the mounting seat 301 or the third housing 302 and the threaded rod 36 is stable, the guiderail 363, the guiderail base 361 and the slider 373 may be omitted. Lastly, any number of rolling bearings and clips may be used.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robot arm, comprising:
a base comprising a first spindle and a first motor to rotate the first spindle in a first axis;
a first arm rotatably connected to the base via the first spindle around the first axis; and
a second arm rotatably connected to the first arm via the second spindle around a second axis substantially parallel to the first axis, the second arm comprising a second spindle, a second motor to rotate the second spindle, a third spindle, a third motor to rotate the third spindle, a threaded rod extending along a third axis parallel to the first axis and rotated by the second spindle, a nut threaded on the threaded rod, a fourth motor fixed relative to the nut, and a fourth spindle connected to and rotated by the fourth motor, wherein the nut moves along the threaded rod to slide the fourth spindle.

2. The robot arm of claim 1, wherein the second arm further comprises a transmission mechanism connected to the third spindle and the threaded rod to transmit movement therebetween.

3. The robot arm of claim 2, wherein the transmission mechanism comprises a first wheel, a second wheel, and a drive belt wrapped around the first wheel and the second wheel; the first wheel is fixedly sleeved on the third spindle and the second wheel is fixedly sleeved on the bottom end of the threaded rod.

4. The robot arm of claim 1, wherein the second arm further comprises a bearing unit wherein the fourth spindle passes therethrough.

5. The robot arm of claim 4, wherein the bearing unit comprises a linear bearing, a tube, at least one rolling bearing, and at least one clip; the fourth spindle slidably passes through the linear bearing; the tube is sleeved on the linear bearing, the at least one clip is positioned between the mounting seat and the tube, and the tube is fixed to the linear bearing.

6. The robot arm of claim 1, wherein the second arm further comprises a guiderail fixed relative to the threaded rod and a slider fixed relative to the nut; the slider engages and slides along the guiderail.

7. The robot arm of claim 6, wherein the second arm further comprises a guiderail base fixed to the guiderail and a mounting seat on which the guiderail base, the second motor, and the third motor are mounted.

8. The robot arm of claim 7, wherein the second arm further comprises a connecting plate, and the slider and the fourth motor are connected to the nut via the connecting plate.

9. The robot arm of claim 7, wherein the second arm further comprises a housing mounted on the mounting seat to cover the second motor, the third motor, the threaded rod, the nut, and the fourth motor.

10. The robot arm of claim 1, wherein the second arm further comprises a reduction gear positioned between the fourth spindle and the fourth motor.

11. The robot arm of claim 10, wherein the reduction gear is a solid spindle harmonic reducer.

12. The robot arm of claim 1, wherein the fourth motor is a servomotor.

* * * * *